US012474341B2

(12) United States Patent
Kiriyama et al.

(10) Patent No.: US 12,474,341 B2
(45) Date of Patent: Nov. 18, 2025

(54) METHOD FOR DETERMINING ONSET RISK OF CARDIOVASCULAR DISEASE IN SUBJECT, AND METHOD FOR DETERMINING VASCULAR CALCIFICATION IN SUBJECT

(71) Applicant: SYSMEX CORPORATION, Kobe (JP)

(72) Inventors: Maria Kiriyama, Kobe (JP); Eiya Tamada, Kobe (JP); Elnaz Nakhaei, Kobe (IR); Mami Onishi, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 202 days.

(21) Appl. No.: 17/675,194

(22) Filed: Feb. 18, 2022

(65) Prior Publication Data

US 2022/0308057 A1     Sep. 29, 2022

(30) Foreign Application Priority Data

Mar. 24, 2021   (JP) ................................ 2021-050256

(51) Int. Cl.
*G01N 33/573*     (2006.01)
(52) U.S. Cl.
CPC ..... *G01N 33/573* (2013.01); *G01N 2333/916* (2013.01); *G01N 2800/32* (2013.01); *G01N 2800/50* (2013.01)
(58) Field of Classification Search
None
See application file for complete search history.

(56) References Cited

U.S. PATENT DOCUMENTS

| 8,993,247 | B2 | 3/2015 | Shanahan et al. |
| 10,139,402 | B2 | 11/2018 | Fujii et al. |
| 2009/0098539 | A1* | 4/2009 | Wilson ............... C12Q 1/682 435/6.1 |

FOREIGN PATENT DOCUMENTS

WO     2020/033467 A1     2/2020

OTHER PUBLICATIONS

Bengtsson et al., Clinical Oral Investigations (2019) 23:1171-1179, Carotid calcifications in panoramic radiographs are associated with future stroke or ischemic heart diseases: a long-term follow-up study. (Year: 2019).*
Mobeirek et al, International Journal of Clinical Medicine, 2014, 5, 249-259. (Year: 2014).*
Shanahan et, Circulation, vol. 100, No. 21, Nov. 23, 1999, p. 2168-2176. (Year: 1999).*
Bilal Mir et al: "Extracellular Vesicles as Delivery Vehicles of Specific Cellular Cargo", Cells, Jul. 2, 2020, vol. 9, Issue No. 7, Article No. 1601, 19 pages.
Wenling Yang et al: "Extracellular vesicles in vascular calcification", Clinica Chimica Acta, 2019, vol. 499, pp. 118-122, Elsevier B.V.
The extended European search report issued on Aug. 18, 2022 in a counterpart European patent application No. 22163963.6.
Ryuichi Watanabe et al., "Mechanism of calcification in vivo", The Japanese Journal of Nephrology, 2014, pp. 1196-1200, vol. 56, No. 8.
Jona B. Krohn et al., "Extracellular vesicles in cardiovascular calcification: expanding current paradigms", The Journal of Physiology, 2016, pp. 2895-2903, vol. 594, No. 11, The Physiological Society.
Elena Aikawa, "Extracellular vesicles in cardiovascular disease: focus on vascular calcification", The Journal of Physiology, 2016, pp. 2877-2880, vol. 594, No. 11, The Physiological Society.
Amirala Bakhshian Nik et al., "Extracellular Vesicles As Mediators of Cardiovascular Calcification", Frontiers in Cardiovascular Medicine, Dec. 11, 2017, vol. 4, Article 78, 7 pages in total.
Claudia Goettsch et al., "Sortilin mediates vascular calcification via its recruitment into extracellular vesicles", The Journal of Clinical Investigation, Apr. 2016, pp. 1323-1336, vol. 126, No. 4.
Japanese Office Action issued on Sep. 10. 2024, in a counterpart Japanese patent application No. 2021-050256.

* cited by examiner

*Primary Examiner* — Gary B Nickol
*Assistant Examiner* — Cheom-Gil Cheong
(74) *Attorney, Agent, or Firm* — Sughrue Mion, PLLC

(57) ABSTRACT

Disclosed is a method of determining onset risk of cardiovascular disease in a subject, the method comprising:
   capturing, on a solid phase, an extracellular vesicle derived from a blood sample collected from the subject; and
   measuring alkaline phosphatase activity of the extracellular vesicle,
   a measured result of the alkaline phosphatase activity being directed for use as an index of the onset risk of cardiovascular disease in the subject.

13 Claims, 18 Drawing Sheets

FIG. 3A

| SPECIMEN No. | LOT No. | AGE | SEX |
|---|---|---|---|
| Pooled | Lot# BJ13559 | Average 38.3 | Male:Female=1:1 |
| N1 | Lot# R531134M | 29 | Male |
| N2 | Lot# R531135M | 47 | Male |
| N3 | Lot# R543435M | 59 | Male |

| SPECIMENS No. | MATRIX | RACE/ETHNICITY | GENDER | AGE | CONGESTIVE HEART FAILURE |
|---|---|---|---|---|---|
| 1 | K2 EDTA Plasma | Caucasian | M | 85 | Diastolic Dysfunction |
| 2 | K2 EDTA Plasma | Caucasian | M | 85 | Systolic Dysfunction |
| 3 | K2 EDTA Plasma | Caucasian | M | 84 | Diastolic & Systolic Dysfunction |
| 4 | K2 EDTA Plasma | Caucasian | M | 81 | Systolic Dysfunction |
| 5 | K2 EDTA Plasma | Caucasian | M | 78 | Diastolic & Systolic Dysfunction |
| 6 | K2 EDTA Plasma | Caucasian | M | 76 | Systolic Dysfunction |
| 7 | K2 EDTA Plasma | Caucasian | M | 76 | Diastolic & Systolic Dysfunction |
| 8 | K2 EDTA Plasma | Caucasian | M | 75 | Systolic Dysfunction |
| 9 | K2 EDTA Plasma | Caucasian | M | 74 | Diastolic & Systolic Dysfunction |
| 10 | K2 EDTA Plasma | Caucasian | M | 73 | Diastolic Dysfunction |
| 11 | K2 EDTA Plasma | Caucasian | M | 73 | Diastolic & Systolic Dysfunction |
| 12 | K2 EDTA Plasma | Caucasian | M | 72 | Diastolic & Systolic Dysfunction |
| 13 | K2 EDTA Plasma | Caucasian | M | 72 | Diastolic & Systolic Dysfunction |
| 14 | K2 EDTA Plasma | Caucasian | M | 71 | Systolic Dysfunction |
| 15 | K2 EDTA Plasma | Caucasian | M | 69 | Diastolic & Systolic Dysfunction |
| 16 | K2 EDTA Plasma | Caucasian | M | 68 | Systolic Dysfunction |

| SPECIMEN No. | AGE | SEX | BMI | SMOKING HISTORY |
|---|---|---|---|---|
| 17 | 70 | Male | 29.762 | Ex-smoker |
| 18 | 81 | Male | 29.668 | Ex-smoker |
| 19 | 76 | Male | 30.864 | Ex-smoker |
| 20 | 74 | Male | 28.965 | Ex-smoker |
| 21 | 81 | Male | 38.204 | Ex-smoker |

FIG. 3D

| SPECIMEN No. | CAC SCORE | SEX | MEDICAL HISTORY | DOSING INFORMATION |
|---|---|---|---|---|
| 22 | >400 | Male | Myocardial infarction (MI), postinfarction cardiac sclerosis | Cardiomagnyl 75 mg |
| 23 | >400 | Female | | Cardiomagnyl 75 mg |
| 24 | 471 | Male | | Cardiomagnyl 75 mg, Verapamil 80 mg |
| 25 | 424 | Male | | Cardiomagnyl 75 mg, Enalapril 5 mg |
| 26 | 480 | Female | | Cardiomagnyl 150 mg, Bisoprolol 10 mg |
| 27 | 1200 | Female | | Cardiomagnyl 75 mg, Lisinopril 10 mg |

FIG. 4A

| CATEGORY | TRADE NAME | MANUFACTURER, PRODUCT NUMBER |
|---|---|---|
| ANTIBODY | Purified anti-human CD9 Antibody | Biolegend, 312102 |
| | Ultra-LEAF Purified anti-human CD63 Antibody | Biolegend, 353039 |
| | Annexin VI Antibody (E-5) | Santa Cruz Biotechnology, sc-271859 |
| | Anti-human SLC20A1 monoclonal antibody | |
| CLEANING SOLUTION | HISCL cleaning solution | sysmex |
| DETECTION SUBSTRATE | HISCL R4/R5 | sysmex |

FIG. 4B

| NAME OF REAGENT | CHEMICAL COMPOSITION |
|---|---|
| Blocking Buffer I | 0.1M Triethanolamine hydrochloride (TEA), pH 7.4, 150 mM NaCl, 10 mg/mL BSA (Proliant, Product# 52101100), 5 mg/mL Casein Na, 0.1% San'ai pack |
| cEV sample dilution buffer | 0.1M Tris-HCl (pH7.5), 150 mM NaCl, 10 mM $MgCl_2$, 1% BSA (Proliant, Product# 7500804), 0.1% San'ai pack |
| Ca-added cleaning solution (for capturing anti-annexin V1 antibody) | HISCL cleaning solution with preadded 1.3 mM $CaCl_2$ |
| HISCL cEV R3 Buf (casein Na) | 0.1M Tris-HCl (pH7.5), 150 mM NaCl, 10 mM $MgCl_2$, 0.1 mM $ZnCl_2$, 1 mg/mL Goat IgG, 0.5% Mouse serum, 1% BSA (Proliant, product# 7500804), 0.5% Casein Na, 0.1% San'ai pack, 30 mg/mL Blocking reagent |

INDUCTION OF TRANSFORMATION
(2 WEEKS)

INDUCTION OF TRANSFORMATION
(2 WEEKS)

FIG. 11

| MEASUREMENT SYSTEM | Anti-CD63 antibody-ALP | Anti-CD9 antibody-ALP | Anti-annexin VI antibody-ALP | Anti-Pit1 antibody-ALP |
|---|---|---|---|---|
| LIMIT OF DETECTION (LOD) | 1.13E+05 particles | 5.19E+04 Particles | 2.82E+05 particles | 5.19E+04 particles |
| DYNAMIC RANGE | 1.13E+05 TO 5.64E+07 particles (500-fold) | 5.19E+04 TO 1.04E+08 particles (2000-fold) | 2.82E+05 TO 5.64E+07 particles (200-fold) | 5.19E+04 TO 3.11E+07 particles (600-fold) |
| SIMULTANEOUS REPEATABILITY | CV<10% | CV<5% | CV<12% | CV<15% |
| INTER-RATER RELIABILITY | CV=34.2% | CV<13% | CV=14.5% | |

METHOD FOR DETERMINING ONSET RISK OF CARDIOVASCULAR DISEASE IN SUBJECT, AND METHOD FOR DETERMINING VASCULAR CALCIFICATION IN SUBJECT

CROSS REFERENCE TO RELATED APPLICATIONS

This application claims priority from prior Japanese Patent Application No. 2021-050256, filed on Mar. 24, 2021, entitled "METHOD FOR DETERMINING ONSET RISK OF CARDIOVASCULAR DISEASE IN SUBJECT, METHOD FOR DETERMINING VASCULAR CALCIFICATION IN SUBJECT, AND TEST KIT", the entire contents of which are incorporated herein by reference.

FIELD OF THE INVENTION

The present invention relates to a method for determining onset risk of cardiovascular disease in a subject, and a method for determining vascular calcification in a subject.

BACKGROUND

Cardiovascular diseases are caused by vascular calcification resulted from long-term involvement of factors such as aging, lifestyle, dyslipidemia, hypertension, and diabetes. Vascular calcification is an ectopic calcification that possibly occurs in vascular tissue which would not cause deposition of calcium crystals if in the normal state (The Japanese Journal of Nephrology 2014; 56(8): 1196-1200 "Mechanism of calcification").

In the clinical site, vascular calcification has been evaluated according to coronary artery calculation score (referred to as "CAC score" or "CAC-S", hereinafter) on the basis of CT image. The CAC score has been reported to demonstrate positive correlation with incidence of cardiovascular events.

SUMMARY OF THE INVENTION

The scope of the present invention is defined solely by the appended claims, and is not affected to any degree by the statements within this summary.

The present invention relates to a method for determining onset risk of cardiovascular disease in a subject, the method including: capturing, on a solid phase, an extracellular vesicle derived from a blood sample collected from a subject; and measuring alkaline phosphatase activity of the extracellular vesicle, a measured result of the alkaline phosphatase activity being an index of the onset risk of cardiovascular disease in the subject.

The present invention relates to a method for determining vascular calcification in a subject, the method including: capturing, on a solid phase, an extracellular vesicle derived from a blood sample collected from a subject; and measuring alkaline phosphatase activity of the extracellular vesicle, a measured result of the alkaline phosphatase activity being an index of vascular calcification in the subject.

BRIEF DESCRIPTION OF THE DRAWINGS

FIG. 3A details donor information of purchased specimens of normal plasma;

FIG. 3B details donor information of purchased specimens derived from patients with history of cardiovascular diseases (CVD);

FIG. 3C details donor information of purchased specimens derived from patients with chronic kidney disease (CKD);

FIG. 3D details donor information of purchased specimens with CAC score;

FIG. 4A summarizes commercially available reagents used in ELISA;

FIG. 4B summarizes laboratory-developed reagents used in ELISA;

FIG. 11 summarizes analytical performances compared among the four analytical systems;

DETAILED DESCRIPTION OF THE PREFERRED EMBODIMENTS

1. Method for Determining Onset Risk of Cardiovascular Disease in Subject

Figure 1:
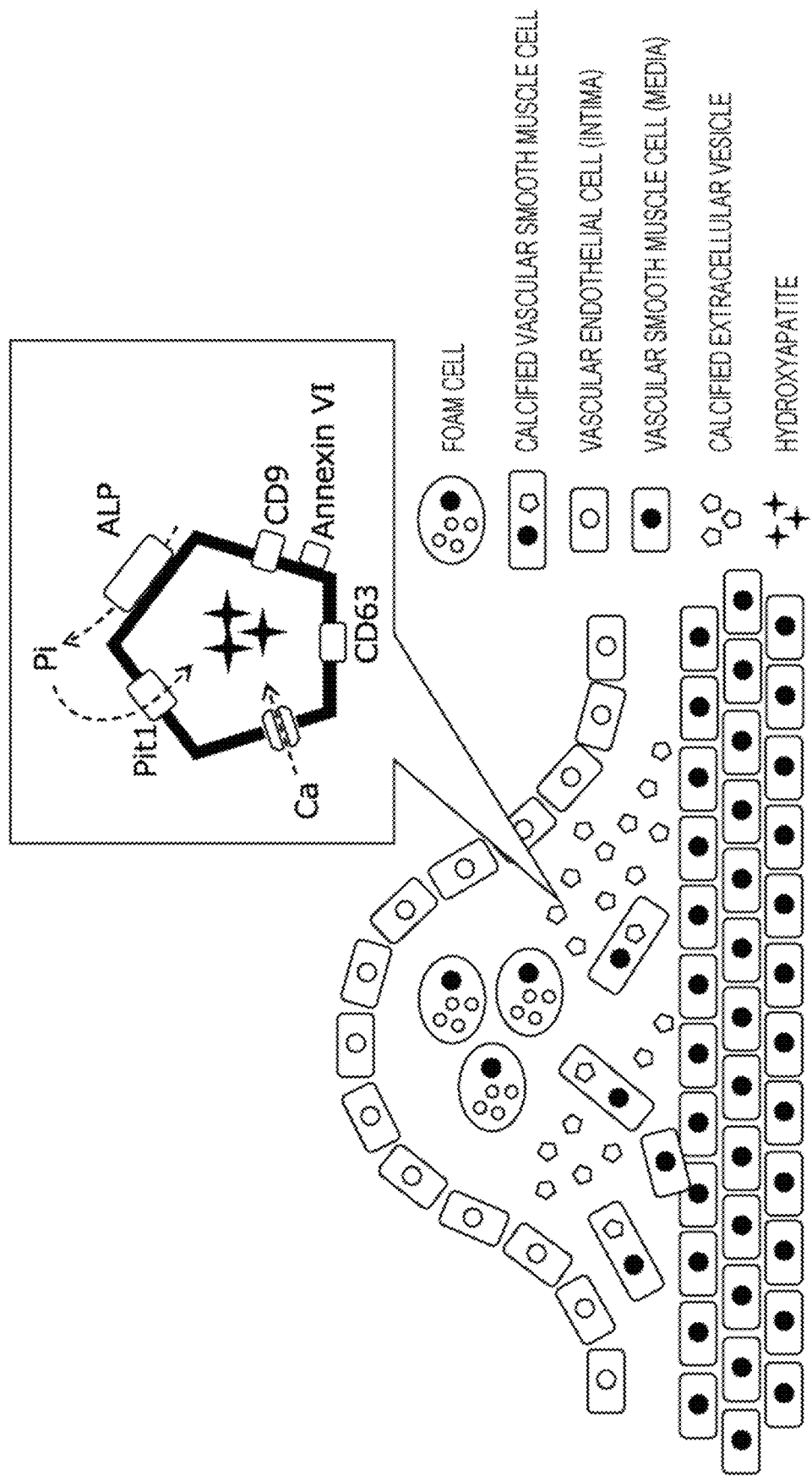
FIG. 1 is a schematic drawing illustrating a calcified site of a blood vessel.

First, calcification of blood vessel will be described with reference to FIG. 1. FIG. 1 is a schematic view of a calcified site of a blood vessel. Atherosclerosis is caused by plaques which is formed in vascular endothelium on which LDL-cholesterol deposits. LDL-cholesterol intrudes between vascular endothelial cells (intima) and vascular smooth muscle cells (media), macrophages that incorporate the LDL-cholesterol turn into foam cells under the vascular endothelium, and accumulate to form an atheroma. In the atheroma, migration of vascular smooth muscle cells that localize in the vascular media to the intima is induced, and also transformation into osteoblast-like cells is induced. This produces calcified extracellular vesicle (calcified EV) that contains hydroxyapatite, thus causing calcification at the atherogenic site. The calcified extracellular vesicle is commonly believed to be stable, and is less likely to be released from the atherogenic site into the blood vessel. The calcified extracellular vesicle typically contains proteins that are commonly believed to reside in the extracellular vesicle (CD9, CD63, and CD81, for example), and proteins that are specific to the calcified extracellular vesicle (Annexin VI, and Pit1, for example), and so forth. The calcified extracellular vesicle also contains membrane-bound alkaline phosphatase (ALP).

In an embodiment, onset risk of cardiovascular disease in a subject is determined by measuring the alkaline phosphatase activity in a blood sample collected from the subject. More specifically, this method includes capturing, on a solid phase, an extracellular vesicle derived from a blood sample collected from a subject (may occasionally be referred to as "step 1", hereinafter); and measuring alkaline phosphatase activity of the extracellular vesicle (may occasionally be referred to as "step 2", hereinafter), wherein a measured result of the alkaline phosphatase activity is directed for use as an index of the onset risk of cardiovascular disease in the subject. All measurement processes contained in this determination method take place in vitro.

(1) Step 1

In step 1, extracellular vesicle derived from a blood sample, which is collected from a subject, is captured on a solid phase.

The subject is not specifically limited. The subject is typically a patient having risk of developing arteriosclerosis. More specifically, the subject may be exemplified by person with obesity, person with hypertension, person with hyperlipidemia, person with diabetes, person with renal dysfunction, and so forth.

The cardiovascular disease may include at least one selected from the group consisting of ischemic heart disease, ischemic brain disease, and ischemic intestinal disorder. The ischemic heart disease may include angina pectoris, myocardial infarction, and so forth. The ischemic brain disease may include cerebral infarction, and so forth. The ischemic intestinal disorder may include intestinal infarction, and so forth.

The blood sample is typically whole blood, plasma or serum. The plasma, when used as the blood sample, may be collected with use of an anticoagulant which is not specifically limited. Such anticoagulant may be potassium EDTA, sodium EDTA, sodium citrate, heparin salt, or the like.

The extracellular vesicle (also referred to as "EV", hereinafter) is a particle that is released from cells, which is covered with a membrane mainly composed of phospholipid, and measures approximately several tens to several thousands of nanometers. The extracellular vesicle includes exosome, microvesicle, apoptotic body, and so forth. In many cases, there are biomolecules in the extracellular vesicle or on a membrane of the extracellular vesicle. For example, the exosome or microvesicle typically contains polypeptide, polynucleotide (RNA such as mRNA, miRNA, and non-coding RNA, or DNA), or the like. For example, the apoptotic body typically includes polypeptide, polynucleotide, fragmented nucleus, organelle, or the like. Now, the polypeptide refers to a compound formed of a plurality of amino acids bound by peptide bonds, and includes protein having a relatively large molecular weight, and peptide having a relatively small molecular weight.

In step 1, a method for capturing extracellular vesicle on the solid phase may rely upon any of known means without special limitation. For example, a blood sample, a capturing body that can bind the extracellular vesicle, and a solid phase may be contacted to form, on the solid phase, a complex (also referred to as "capturing body-EV complex", hereinafter) that contains the extracellular vesicle and the capturing body. The solid phase and the capturing body preferably contain a binding substance and a binding partner, respectively. The binding substance is exemplified by avidin, an avidin-like substance (Streptavidin, Tamavidin (trademark), NeutrAvidin, etc.), and antibody against the binding partner. The binding partner is a substance that specifically binds the binding substance, and is exemplified by biotin, biotin analog, and 2,4-dinitrophenol. The capturing body is preferably bound to the solid phase, via the binding substance and the binding partner. The capturing body may only be a substance capable of specifically binding the extracellular vesicle without special limitation, for which antibody, aptamer, or the like is applicable.

In step 1, the capturing body-EV complex may be formed on the solid phase, by contacting the solid phase having the capturing body immobilized thereon, and a blood sample that contains the extracellular vesicle. The order of contact among the capturing body, the blood sample, and the solid phase is not specifically limited. For example, the solid phase and the blood sample are contacted in advance, and the capturing body is then added. In another embodiment, the solid phase and the capturing body are contacted in advance, and the blood sample is then added. In this case, the capturing of the capturing body on the solid phase is preferably followed by B/F separation to remove any unreacted free component, and then followed by addition of the blood sample. In another embodiment, the capturing body-EV complex is formed first in a solution, by contacting the capturing body with the blood sample that contains the extracellular vesicle, and the solid phase is then added. In either embodiment, the B/F separation preferably succeeds the formation of the capturing body-EV complex on the solid phase, and precedes step 2. A reaction in step 1 usually takes place in a buffer solution. Buffering agent contained in the buffer solution usable herein may be any type of substances known in the art, without special limitation as long as it would not inhibit the reaction. The B/F separation may employ a cleaning liquid that contains a buffering agent, a surfactant, or the like. The buffering agent and the surfactant usable herein may be any type of substances known in the art, without special limitation as long as they can properly take part in the B/F separation. Conditions such as reaction time and reaction temperature may be properly determined depending on the type of the capturing body and so forth.

The capturing of the extracellular vesicle on the solid phase may be preceded by extraction of the extracellular vesicle by size exclusion chromatography, ultracentrifugation, affinity purification, polymer precipitation method, or the like. Such extraction may, however, be omissible for the measurement in this embodiment.

Antibody (referred to as "capture antibody", hereinafter) used as the capturing body is not limited, as long as it can capture the extracellular vesicle. The capture antibody can preferably bind at least a part of protein that resides in the extracellular vesicle. Only one type, or two or more types of the capture antibody may be used. "Antibody" used herein may be any of polyclonal antibody, a monoclonal antibody, reduced antibody, a bispecific antibody, and fragments thereof (Fab, F(ab'), or F(ab)$_2$, for example). Class and subclass of immunoglobulin are not specifically limited. The antibody may be screened from an antibody library, or may be chimeric antibody, scFv, or the like.

The capture antibody is exemplified by antibodies against anti-CD9 antibody (clone H19a, 12A12, etc.), anti-CD63 antibody (such as clone H5C6), CD81 (such as clone 5A6), anti-Annexin VI antibody (such as clone E-5), and anti-Pit1 antibody/SLC 20A1 (such as clone 6A9-F2), among which at least one type may be used. These antibodies may be those commercially available.

The solid phase used herein may be any of those known in the art. Material for composing the solid phase is selectable, without special limitation, typically from organic polymer compound, inorganic compound, and biopolymer. The organic polymer compound is exemplified by latex, polystyrene and polypropylene. The inorganic compound is exemplified by magnetic substance (iron oxide, chromium oxide, ferrite, etc.), silica, alumina and glass. The biopolymer is exemplified by insoluble agarose, insoluble dextran, gelatin and cellulose. Two or more of them may be used in combination. The solid phase may have any form not specifically limited, and is exemplified by particle, microplate, membrane, microtube and test tube.

(2) Step 2

In step 2, the alkaline phosphatase activity of the extracellular vesicle is measured. More specifically, the extracellular vesicle captured on the solid phase in the aforementioned (1) is contacted with the substrate for alkaline phosphatase, and a product resulted from the enzymatic reaction is measured. A measured value of the product is a value that represents alkaline phosphatase activity. Measurement conditions are not limited as long as alkaline phosphatase can remain active.

The substrate for alkaline phosphatase is exemplified by chemiluminescent substrates such as CDP-Star (registered trademark) (disodium 4-chloro-3-(methoxyspiro[1,2-dioxetane-3,2'-(5'-chloro)tricyclo[3.3.1.13,7]decane]-4-yl)phenylphosphate), and CSPD (registered trademark) (disodium 3-(4-methoxyspiro[1,2-dioxetane-3,2-(5'-chloro)tricyclo[3.3.1.13,7]decane]-4-yl) phenylphosphate); and chromogenic substrate such as 5-bromo-4-chloro-3-indolylphosphate (BCIP), disodium 5-bromo-6-chloro-indolylphosphate, and p-nitrophenylphosphoric acid. Particularly preferred is CDP-Star (registered trademark) which is a chemiluminescent substrate. The luminescence resulted from the enzymatic reaction is preferably detected as a chemiluminescent signal with use of a luminometer.

(3) Assessment of Onset Risk of Cardiovascular Disease

As will be described later in EXAMPLES, subjects having high CAC scores were found to demonstrate significantly higher levels of alkaline phosphatase activity, than subjects having relatively low CAC scores, proving correlation between the CAC score and the alkaline phosphatase activity. The CAC score has been known to be useful for predicting risk of cardiovascular disease. The measured result of the alkaline phosphatase activity may therefore be directed for use as an index of the risk of cardiovascular disease in the subject. Now, the CAC score is a value of severity of calcification quantified by coronary artery CT, and has been used as an index of the severity of calcification. Evaluation involves CAC score of 0 point for uncalcified (no plaque), CAC score of 1 to 10 points for ultra-mild (small amount of plaque), CAC score of 11 to 100 points for mild (some plaque), CAC score of 101 to 400 points for moderate (moderate amount of plaque), and CAC score of 401 points or above for severe (large amount of plaque).

In the present specification, the "measured result of alkaline phosphatase activity" may be a value closely related to the alkaline phosphatase activity. The value is a measured value of chemiluminescence intensity, for example. The measured value of chemiluminescence intensity is a value closely related to the amount of substance of the enzymatic reaction product, and this value is closely related to the alkaline phosphatase activity.

In a preferred embodiment, the measured result of the alkaline phosphatase activity, when found to be equal to or higher than a predetermined threshold value, suggests a high onset risk of cardiovascular disease in the subject. In another preferred embodiment, the measured result of the alkaline phosphatase activity, when found to be lower than a predetermined threshold value, suggests a low onset risk of cardiovascular disease in the subject. In a more preferred embodiment, the measured result of the alkaline phosphatase activity, when found to be equal to or higher than a predetermined threshold value, suggests a high onset risk of cardiovascular disease in the subject, meanwhile, the measured result of the alkaline phosphatase activity, when found to be lower than the predetermined threshold value, suggests a low onset risk of cardiovascular disease in the subject.

The "predetermined threshold value" refers to a threshold value of the measured result of the alkaline phosphatase activity. The threshold value may be determined on the basis of measured results of the alkaline phosphatase activity of the subjects having low CAC scores or healthy subjects, and measured results of the alkaline phosphatase activity of the subjects having high CAC scores.

For example, the measured results of the alkaline phosphatase activity are acquired with use of the blood samples collected from a plurality of healthy subjects, and the measured results of the alkaline phosphatase activity are also acquired with use of the blood samples collected from a plurality of subjects having the CAC scores of 401 points or higher. On the basis of these measured results, the "threshold value" may be determined as a value that can most accurately classify the healthy subjects and the subjects having a CAC score of 401 points or higher. Now, the "value that can most accurately classify . . . " may be properly determined depending on purpose of examination, while considering indices such as sensitivity, specificity, positive predictive value, negative predictive value, and so forth. Such value may be determined typically by ROC analysis.

The threshold value may be determined by a highest measured result, from among the measured results of the alkaline phosphatase activity in a plurality of healthy subjects. Such threshold value may properly be used in order to reduce false positive as possible, in a case where it is necessary to reduce the economic and physical burden of the patient due to the therapeutic action, such as in a case where expensive treatment is required, or in a case where a side effect of a therapeutic agent is strong.

The threshold value may be determined by a lowest measured result, from among the measured results of the alkaline phosphatase activity in a plurality of subjects having CAC scores of 401 points or higher. In a case where false negativity is desired to be reduced as possible such as in screening test, such threshold value may be suitably used.

The "measured result of the alkaline phosphatase activity" may be a temporal change of the measured result obtained from the same subject. The temporal change can serve as an index of the onset risk of cardiovascular disease. For example, a measured result at a first time point of a specific single subject may be compared with a measured result at a second time point, and the onset risk of cardiovascular disease may be evaluated on the basis of change in the measured results. Note that the first time point and the second time point are different time points. When evaluating the measured result at the second time point, the measured result at the first time point may be used as the "threshold value".

Another embodiment relates to a method for determining the onset risk of cardiovascular disease, including the aforementioned step 1, the aforementioned step 2, and a determination step. The determination step is a step of determining the onset risk of cardiovascular disease in the subject, on the basis of the measured result of the alkaline phosphatase activity obtained in step 2. In the determination step, the onset risk may be determined on the basis of result of comparison between the measured result of the alkali phosphatase activity with the threshold value. In the comparison, the alkali phosphatase activity, if found to be equal to or higher than the threshold value, may determine a high onset risk of cardiovascular disease, meanwhile the alkali phosphatase activity, if found to be lower than the threshold value, may determine a low onset risk of cardiovascular disease.

The embodiment may further involve providing medical intervention for cardiovascular disease to the subject whose onset risk was determined to be high. The embodiment involving such step relates to a method for treating a subject whose onset risk of cardiovascular disease was determined to be high by the aforementioned determination method (also referred to as "treatment method", hereinafter). Examples of the medical intervention include antihypertensive therapy, administration of medicine suitable for cardiovascular disease or vascular calcification, and so forth. Examples of the medicine include phosphorus adsorbent, cholesterol treating agent, thrombolytic agent, antithrombotic agent, antiplatelet agent, and vasodilator.

2. Method for Determining Vascular Calcification in Subject

A method for determining vascular calcification in a subject includes capturing, on a solid phase, an extracellular vesicle derived from a blood sample collected from a subject (may occasionally be referred to as "step A", hereinafter); and measuring alkaline phosphatase activity of the extracellular vesicle (may occasionally be referred to as "step B", hereinafter), wherein a measured result of the alkaline phosphatase activity is directed for use as an index of vascular calcification in the subject. All measurement processes contained in this determination method take place in vitro. The step A and the step B are the same as the aforementioned step 1 and step 2, respectively.

As will be described later in EXAMPLES, subjects having high CAC scores were found to demonstrate significantly higher levels of alkaline phosphatase activity, than subjects having relatively low CAC scores, proving correlation between the CAC score and the alkaline phosphatase activity. The CVD patients and the CKD patients were also found to have the alkaline phosphatase activity, significantly higher than that of the healthy subjects. The CAC score has been known to be an index of vascular calcification, and vascular calcification is observed in the CVD and CKD patients. That is, the measured result of the alkaline phosphatase activity can be used as an index of vascular calcification of the subject.

Preferably, the measured result of the alkaline phosphatase activity, if found to be equal to or higher than the predetermined threshold value, suggests presence of vascular calcification or enhancement of vascular calcification in the subject. Meanwhile, the measured result of the alkali phosphatase activity, if found to be lower than the predetermined threshold value, suggests absence of vascular calcification, or improvement of vascular calcification as a result of therapy or the like, in the subject.

The "predetermined threshold value" refers to a threshold value of the measured result of the alkaline phosphatase activity. The threshold value may be determined on the basis of measured results of the alkaline phosphatase activity of the subjects having low CAC scores or healthy subjects; and measured results of the alkaline phosphatase activity of the subjects having high CAC scores, CVD patients, or CKD patients.

For example, the measured results of the alkaline phosphatase activity are acquired with use of the blood samples collected from a plurality of healthy subjects, and the measured results of the alkaline phosphatase activity are acquired with use of the blood samples collected from a plurality of subjects having the CAC scores of 401 points or higher. A value that can most accurately classify the healthy subjects and the subject having the CAC scores of 401 points or higher on the basis of such measured results can be determined as the "threshold value". Now, the "value that can most accurately classify . . . " may be properly determined depending on purpose of examination, on the basis of indices such as sensitivity, specificity, positive predictive value, negative predictive value, and so forth. Such value may be determined by, for example, ROC analysis.

The threshold value may be determined by a highest measured result, from among the measured results of the alkaline phosphatase activity in a plurality of healthy subjects. Such threshold value may properly be used in order to reduce false positive as possible, in a case where it is necessary to reduce the economic and physical burden of the patient due to the therapeutic action, such as in a case where expensive treatment is required, or in a case where a side effect of a therapeutic agent is strong.

The threshold value may be determined by a lowest measured result, from among the measured results of the alkaline phosphatase activity in a plurality of subjects having CAC scores of 401 points or higher. In a case where false negativity is desired to be reduced as possible such as in screening test, such threshold value may be suitably used.

The "measured result of the alkaline phosphatase activity" may be a temporal change of the measured result obtained from the same subject. The temporal change can serve as an index of the onset risk of cardiovascular disease. For example, a measured result at a first time point of a specific single subject may be compared with a measured result at a second time point, and the onset risk of cardiovascular disease may be evaluated on the basis of change in the measured results. Note that the first time point and the second time point are different time points. When evaluating the measured result at the second time point, the measured result at the first time point may be used as the "threshold value".

Another embodiment relates to a method for determining vascular calcification, including the aforementioned step A, the aforementioned step B, and a determination step. The determination step is a step of determining vascular calcification in the subject, on the basis of the measured result of the alkaline phosphatase activity obtained in step B. In the determination step, vascular calcification may be determined on the basis of result of comparison between the measured result of the alkali phosphatase activity with the threshold value. In the comparison, the alkali phosphatase activity, if found to be equal to or higher than the threshold value, may determine presence of vascular calcification, meanwhile the alkali phosphatase activity, if found to be lower than the threshold value, may determine absence of vascular calcification.

The embodiment may further involve providing medical intervention for vascular disease to the subject in which presence of vascular calcification was determined. The embodiment involving such step relates to a method for treating a subject in which presence of vascular calcification was determined by the aforementioned determination method (also referred to as "treatment method", hereinafter). Examples of the medical intervention include antihypertensive therapy, administration of medicine suitable for cardiovascular disease or vascular calcification, and so forth. Examples of the drug to be administered include phosphorus adsorbent, cholesterol treating agent, thrombolytic agent, antithrombotic agent, antiplatelet agent and vasodilator.

3. Test Kit

Figure 2:
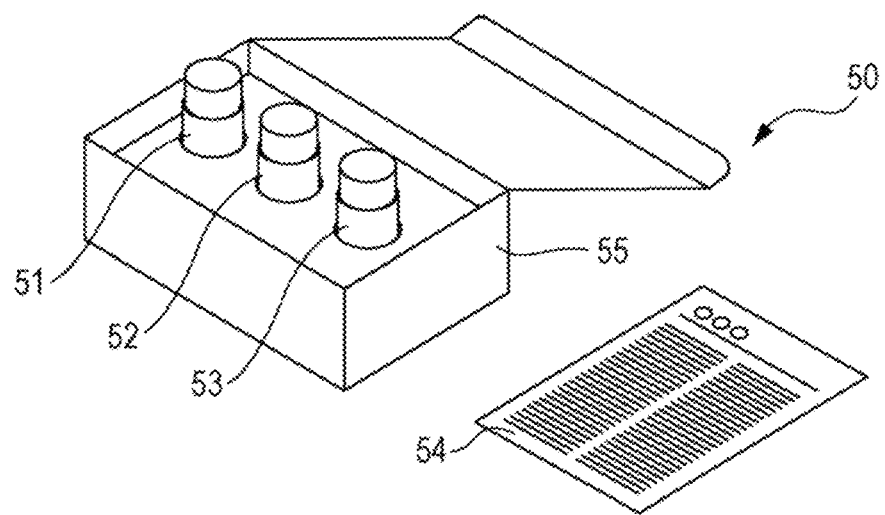
FIG. 2 is a drawing illustrating an appearance of a test kit.

An embodiment relates to a test kit used in the method having been described in the aforementioned section 1 or 2. An exemplary test kit is illustrated in FIG. 2. A test kit 50 contains a first container 51 that contains a capturing body, a second container 52 that contains a plurality of particles as the solid phase, a third container 53 that contains a substrate for alkaline phosphatase, and a package insert 54 that describes a method for using the kit and so forth. All of them are enclosed in a packaging box 55. As for explanation of the capturing body, the solid phase, and the substrate for alkaline phosphatase, the explanation in the aforementioned section 1. will be incorporated herein by reference. The solid phase, having been illustrated as particles in FIG. 2, may alternatively have any other form such as microplate, membrane, microtube, or test tube, in place of the second container 52.

Examples

Hereinafter, the present invention will be further detailed referring to Examples. The present invention is, however, not construed as being limited to Examples.

1. Materials and Methods 1-1. Cell Culture and Calcification Induction, Alizarin Red Staining, and Preparation of Calcified Extracellular Vesicle Human osteosarcoma derived cell line Saos-2 cell was purchased from RIKEN BioResource Research Center (RIKEN BRC). The cell was cultured according to the RIKEN BRC culture method, with use of McCoy's 5A medium (Sigma-Aldrich) containing 15% FBS, in 5% $CO_2$ at 37° C.

The Saos-2 cell for calcification induction was cultured up to confluence in αMEM (GIBCO) containing 10% FBS, the medium was changed to a calcification induction medium (αMEM with 10% FBS, 10 mM HEPES (Nacalai Tesque), 50 ug/mL ascorbate 2-phosphate (Sigma-Aldrich) and 1.8 mM potassium dihydrogen phosphate (FUJIFILM Wako Pure Chemical Corporation)), and the culture was continued for 14 days. The cell was cultured while refreshing the culture medium once every two or three days up to day-10 after the change to the culture medium for calcification induction, then kept unchanged from day-10 to day-14, and the broth was then recovered. The recovered Saos-2 cell was fixed with use of 4% PFA at 4° C. for 10 minutes, washed three times with PBS, and stained with Alizarin Red with use of 50 mM Alizarin Red (pH 4.2), at room temperature for 10 minutes.

The broth was centrifuged at 300 g for 10 minutes, and further at 2000 g for 10 minutes, the supernatant was decanted into an ultracentrifuge tube, and then ultracentrifuged at 100,000 g (50,000 rpm) for 28 minutes. The precipitate in the ultracentrifuge tube was collected, and resuspended in 5 mM phosphate buffer or 5 mM phosphate buffer containing 1% BSA, to prepare calcified extracellular vesicle.

1-2. Purchased Specimens and Preparation of Calcified Extracellular Vesicle-Depleted Normal Human Pooled Plasma Specimens Normal human pooled plasma and normal human single-donor plasma specimens (anticoagulants: EDTA-2K for all) were purchased from Kohjin Bio (Product #12271430) and Cosmo Bio (Product #12271420), respectively. Donor information is as summarized in FIG. 3A. The CAC score of healthy human plasma, although not attached to the purchased products, is usually zero point or extremely small point, so that evaluation in this embodiment was conducted while assuming the CAC score of the healthy human plasma as zero point. Specimens of patients with history of cardiovascular disease (CVD) (16 specimens in total, anticoagulant: EDTA-2K, chronic renal failure and dialysis patients excluded) were purchased from ProMedex. Donor information is as summarized in FIG. 3B. Chronic kidney disease (CKD) specimens (5 specimens in total) and specimens with CAC score (6 specimens in total, chronic renal failure and dialysis patients excluded) were purchased from Reprocell and BioIVT, respectively (anticoagulant: EDTA-2K for all). Donor information is as summarized FIGS. 3C and 3D. As summarized in FIG. 3D, all specimens with the CAC score exceed 400 points, whose calcification severity being evaluated to be "severe".

Calcified extracellular vesicle-depleted normal human pooled plasma specimens were prepared as follows. Each purchased normal human pool plasma specimen was centrifuged at 300 g for 10 minutes, then at 2,000 g for 10 minutes, and the supernatant was then decanted into an ultracentrifuge tube. The supernatant was ultracentrifuged at 100,000 g (50,000 rpm) for 28 minutes, to precipitate the extracellular vesicle. The supernatant was collected as a specimen.

1-3. Measurement of Alkali Phosphatase Activity

The individual reagents used for ELISA are summarized in FIGS. 4A and 4B.

The specimens used herein were the sample that contains the calcified extracellular vesicle induced in vitro in the aforementioned section 1-1, and the specimen prepared in the aforementioned section 1-2.

A 96-well plate (Nunc, high binding ELISA plate, #436110) was washed twice with 50 mM Tris-HCl, pH 7.5. Each of the antibodies summarized in FIG. 4A was adjusted to a concentration of 5 μg/mL with 50 mM Tris-HCl (pH 7.5), to prepare antibody solution of each antibody. Fifty microliters per well of each antibody solution was added to the wells of the 96-well plate. The solution in the well was discarded, the plate was washed three times with 5 mM phosphate buffer, 200 μL/well of Blocking Buffer I was added, and the content was incubated at room temperature for 2.5 hours, while being stirred with a shaker at 600 rpm. The incubation time was set to one hour, only for a case with anti-CD63 antibody used as the solid phase-bound antibody. The specimens prepared herein include undiluted plasma specimen for the wells having anti-CD63 antibody or anti-Pit1 antibody as the solid phase-bound antibody; 50% plasma diluted with an equal amount of cEV sample dilution buffer, for the wells having anti-CD9 antibody; and 50% plasma/1.3 mM $CaCl_2$ diluted with an equal amount of cEV sample dilution buffer that contains 2.6 mM $CaCl_2$) for the wells having anti-Annexin VI antibody. After discarding the Blocking Buffer I, 100 μL/well of each specimen was added, and the content was incubated at room temperature for 2.5 hours while being stirred with a shaker at 600 rpm. The incubation time was set to one hour, only for a case with anti-CD63 antibody used as the solid phase-bound antibody. After discarding the solution in the wells, the wells were washed six times with use of 300 μL/well of HISCL washing solution for the wells having anti-CD63 antibody, anti-CD9 antibody, or anti-Pit1 antibody as the solid phase-bound antibody; and with use of 300 μL/well of HISCL washing solution that contains 1.3 mM $CaCl_2$) for the wells with anti-Annexin VI antibody.

After the washing, 100 μL/well of HISCL R5 reagent was added, the content was incubated at room temperature for 20 minutes, and chemiluminescence was then detected with a plate reader (TECAN, Infinite Pro 200) to measure ALP activity.

2. Results 2-1. Evaluation of Induced Calcified Extracellular Vesicle

Figure 5A:
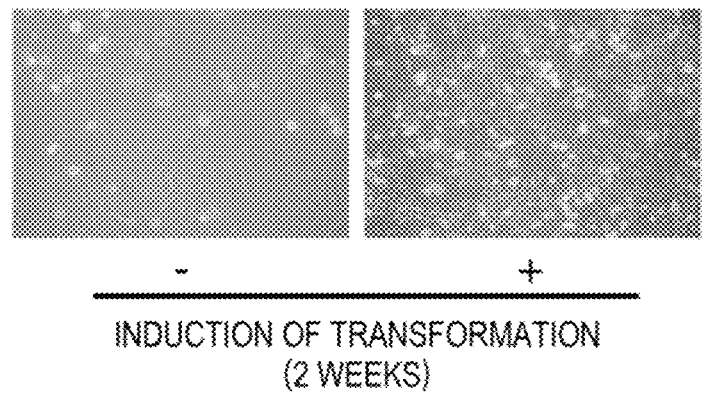
FIG. 5A illustrates phase-contrast micrographs of cells two weeks after induction, wherein the left micrograph illustrates cells having not undergone transformation induction and the right micrograph illustrates cells having undergone transformation induction.
Figure 5B:
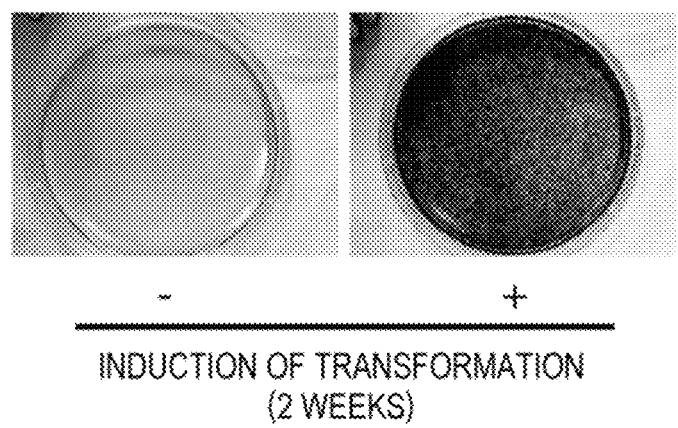
FIG. 5B illustrates images of Alizarin Red stained cells two weeks after induction, wherein the left micrograph illustrates cells having not undergone transformation induction and the right micrograph illustrates cells having undergone transformation induction.
Figure 5C:
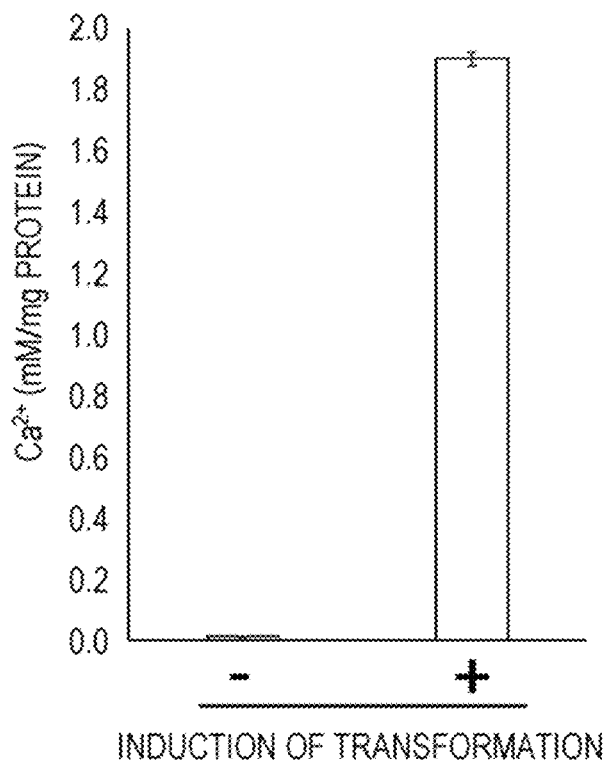
FIG. 5C illustrates results of measuring amount of calcium.
Figure 5D:
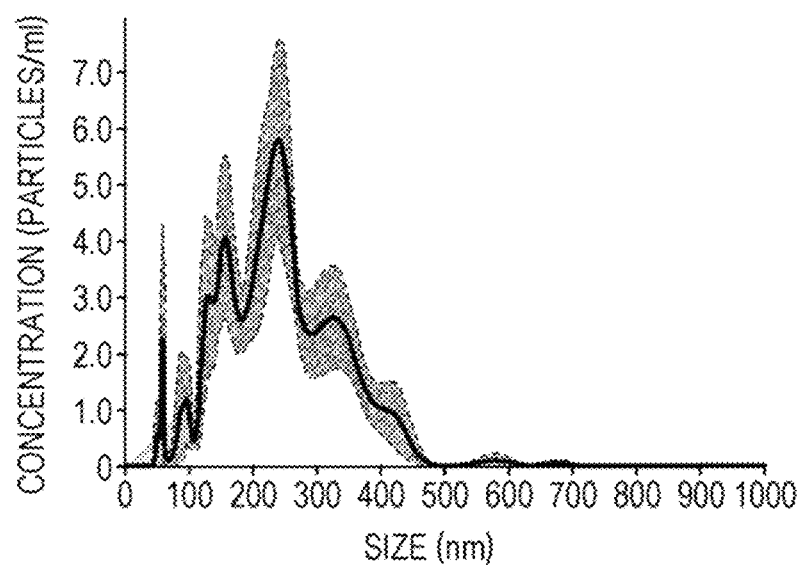
FIG. 5D illustrates results of tracking analysis of nanoparticle in a culture supernatant of the cells having undergone transformation induction.
Figure 5E:
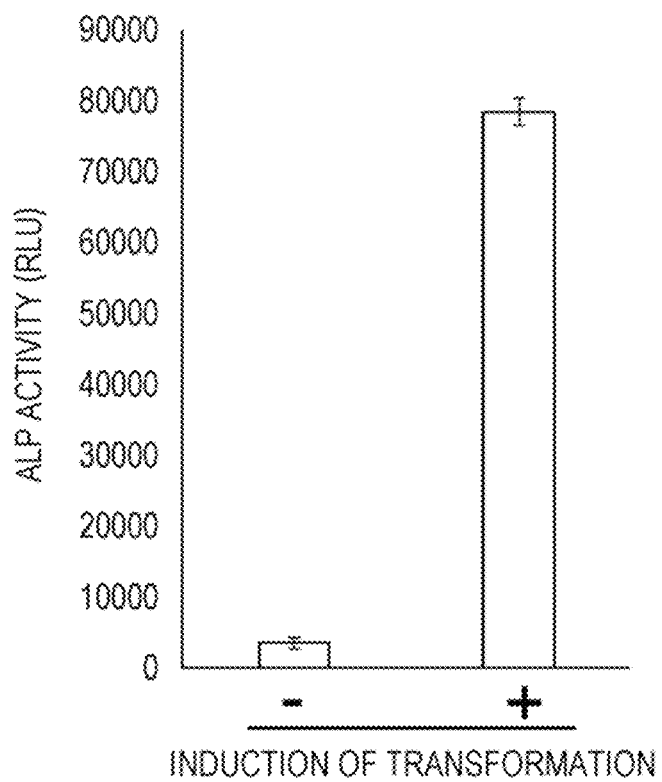
FIG. 5E illustrates alkali phosphatase (ALP) activity of a precipitate collected by ultracentrifugation from a culture supernatant of the cells having not undergone transformation induction, and a precipitate collected by ultracentrifugation from a culture supernatant of the cells having undergone transformation induction.
Figure 6A:
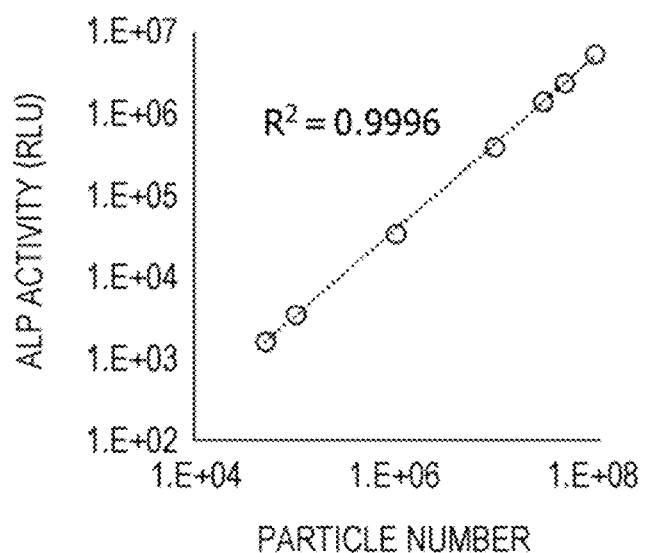
FIG. 6A illustrates dilution linearity plotted between alkaline phosphatase (ALP) activity and particle number of extracellular vesicle, in a case where anti-CD9 antibody was used as the capture antibody, wherein the number of added particles was measured by nanoparticle tracking analysis.
Figure 6B:
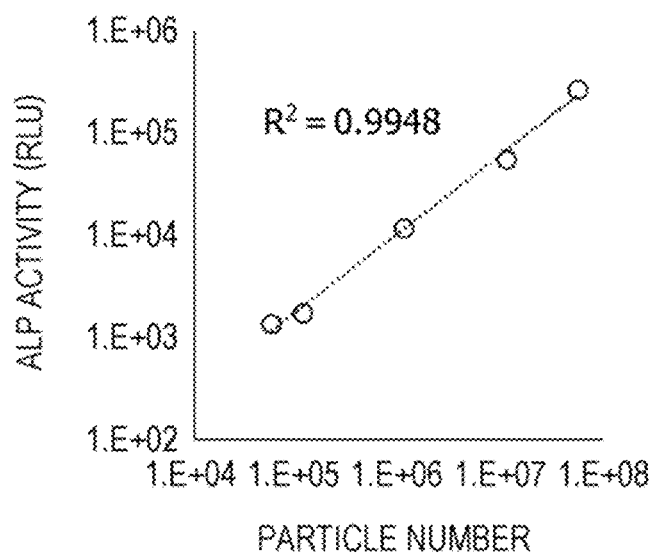
FIG. 6B illustrates dilution linearity plotted between alkaline phosphatase (ALP) activity and particle number of extracellular vesicle, in a case where anti-CD63 antibody was used as the capture antibody, wherein the number of added particles was measured by nanoparticle tracking analysis.
Figure 6C:
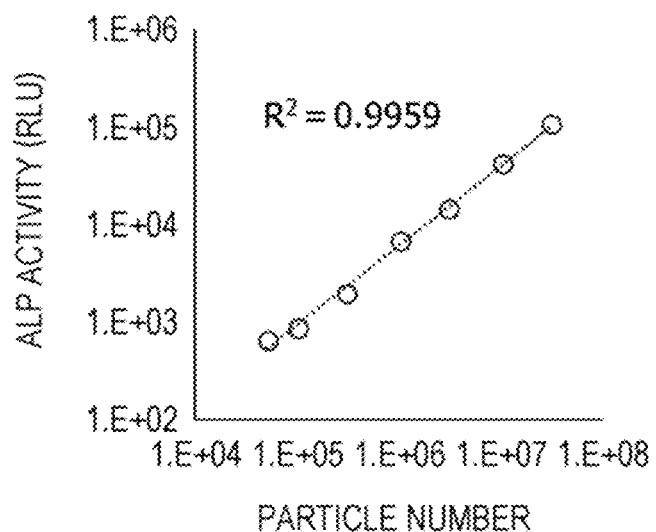
FIG. 6C illustrates dilution linearity plotted between alkaline phosphatase (ALP) activity and particle number of extracellular vesicle, in a case where anti-Pit1 antibody was used as the capture antibody, wherein the number of added particles was measured by nanoparticle tracking analysis.
Figure 6D:
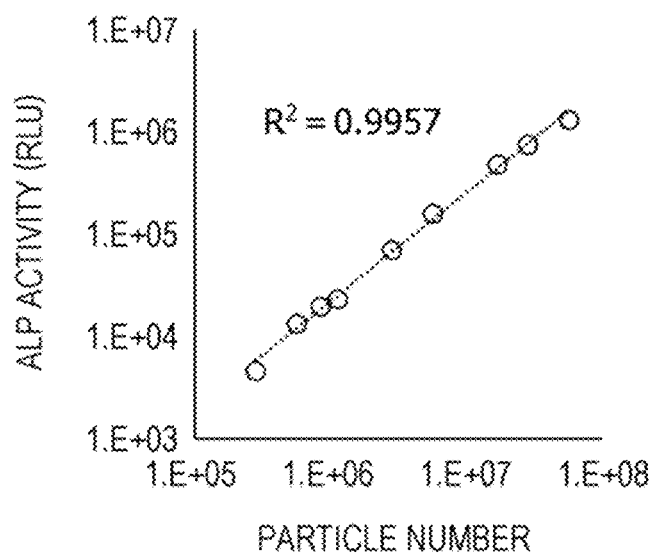
FIG. 6D illustrates dilution linearity plotted between alkaline phosphatase (ALP) activity and particle number of extracellular vesicle, in a case where anti-Annexin VI antibody was used as the capture antibody.

Calcification in osteoblast-like cells transformed from the osteosarcoma cell line Saos-2 cell by the method, having been described in section 1-1, was evaluated. The results are illustrated in FIGS. 5A to 5E. FIG. 5A illustrates phase-contrast micrographs of the cells two weeks after induction, and FIG. 5B illustrates images of Alizarin Red stained cells. The left frames in FIGS. 5A and 5B illustrate cells having not undergone transformation induction, and the right frames in FIGS. 5A and 5B illustrate cells having undergone transformation induction. Calcification was confirmed in the cells having undergone transformation induction. FIG. 5C illustrates results of measurement of calcium level in the cells having not undergone transformation induction and cells having undergone transformation induction, each collected from a 15 cm plate and measured by the o-cresolphtalein complexone method. The plate that contains the cells having undergone transformation induction was found to have a calcium level 127 times higher than the plate that contains the cells having not undergone transformation induction. FIG. 5D illustrates distributions of the number of particles and the particle size in the culture supernatant of the cells having undergone transformation induction, analyzed by nanoparticle tracking analysis. The measurement was repeated three times for every supernatant, with quintuple consecutive measurement for each time. Average particle size was found to be 246.7±3.7 nm, and average particle concentration was found to be $1.92 \times 10^{10}$ (particles)/mL. The culture supernatant of the cells having not undergone transformation induction, and the culture supernatant of the cells having undergone transformation induction were ultracentrifuged under the conditions having been described in section 1-1., and the precipitates were observed under a transmission electron microscope. In this observation, the extracellular vesicle was not found in the precipitate from the culture supernatant of the cells having not undergone transformation induction. On the other hand, the extracellular vesicle was observed in the precipitate from the culture supernatant of the cells having undergone transformation induction. FIG. 5E illustrates the ALP activity of the precipitate from the ultracentrifuged culture supernatant of the cells having not undergone transformation induction, and the precipitate from the ultracentrifuged culture supernatant of the cells having undergone transformation induction. The ALP activity was measured by adding HISCL R5 reagent to the precipitate sample (1 μg/well) collected by ultracentrifugation. For the measurement, three measurement samples were collected from each precipitate sample, and measurement was performed. The measurement was repeated twice. The ALP activity was hardly found in the precipitate from the ultracentrifuged culture supernatant of the cells having not undergone transformation induction, whereas high ALP activity was found in the precipitate from the ultracentrifuged culture supernatant of the cells having undergone transformation induction.

Next, dilution linearity plotted between the number of particles of extracellular vesicle and the ALP activity was examined, with use of a dilution series prepared by diluting stepwise the calcified extracellular vesicle. The number of particles was measured by nanoparticle tracking analysis. The dilution linearity was examined by comparing the ALP activity and the number of particles, with use of anti-CD9 antibody, anti-CD63 antibody, anti-Pit1 antibody, and anti-Annexin VI antibody as the capture antibodies (solid phase-bound antibody). The results demonstrated, as illustrated in FIGS. 6A to 6D, good linearity for all capture antibodies.

2-2. Verification of Effect with Use of Blood Samples

Analytical performance was examined by using, as the specimen, healthy subject plasma, donor plasma given CAC score (CAC-S), CKD patient plasma, and patient plasma with CVD history.

(1) Anti-CD9 Antibody-ALP System

Figure 7A:
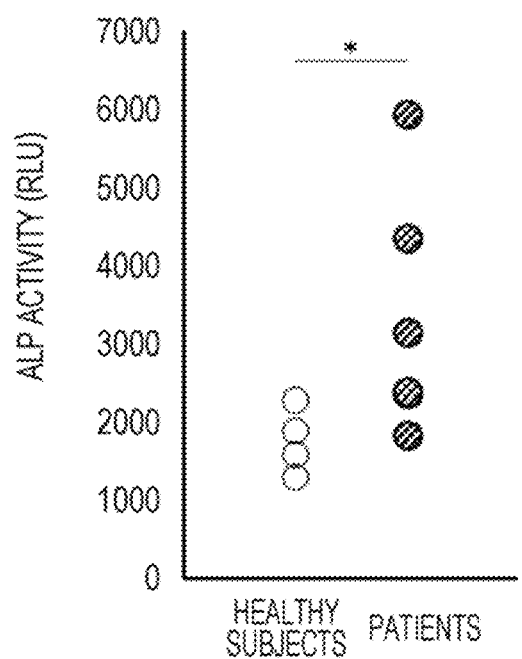
FIG. 7A illustrates alkaline phosphatase (ALP) activity measured in an anti-CD9 antibody-ALP system, compared between plasma of healthy subjects (n=4) and plasma of CVD patients given CAC-S (n=5)
Figure 7B:
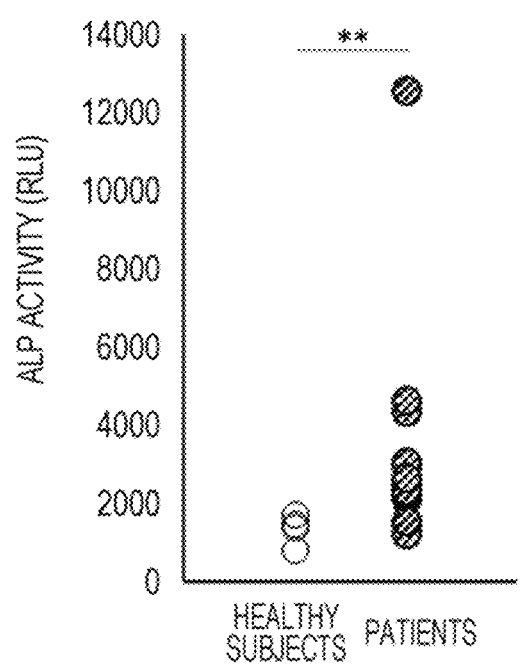
FIG. 7B illustrates alkaline phosphatase (ALP) activity measured in an anti-CD9 antibody-ALP system, compared between plasma of healthy subjects (n=4) and plasma of CVD patients (n=16)
Figure 7C:
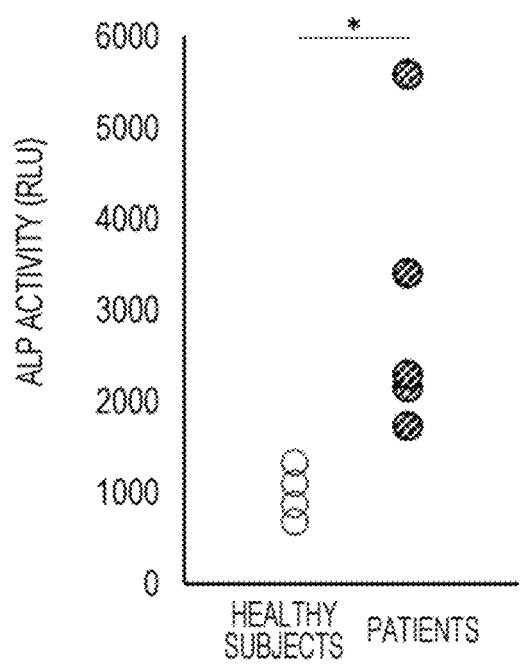
FIG. 7C illustrates alkaline phosphatase (ALP) activity measured in an anti-CD9 antibody-ALP system, compared between plasma of healthy subjects (n=4) and plasma of CKD patients (n=5), wherein *$p<0.05$ and **$p<0.01$ indicate significant differences.

Results of the cases with anti-CD9 antibody used as the capture antibody are illustrated in FIGS. 7A to 7C. FIG. 7A illustrates the ALP activity compared between the plasma of healthy subjects (n=4) and the plasma of patients given CAC-S (n=6). FIG. 7B illustrates the ALP activity compared between the plasma of healthy subjects (n=4) and the plasma of CVD patients (n=16). FIG. 7C illustrates the ALP activity compared between the plasma of healthy subjects (n=4) and the plasma of CKD patients (n=5). *p<0.05 and **p<0.01 indicate significant differences. The ALP activity of the extracellular vesicle of the healthy subject plasma was found to be significantly lower than the ALP activity of the extracellular vesicle of the patient plasma.

(2) Anti-CD63 Antibody-ALP System

Figure 8:
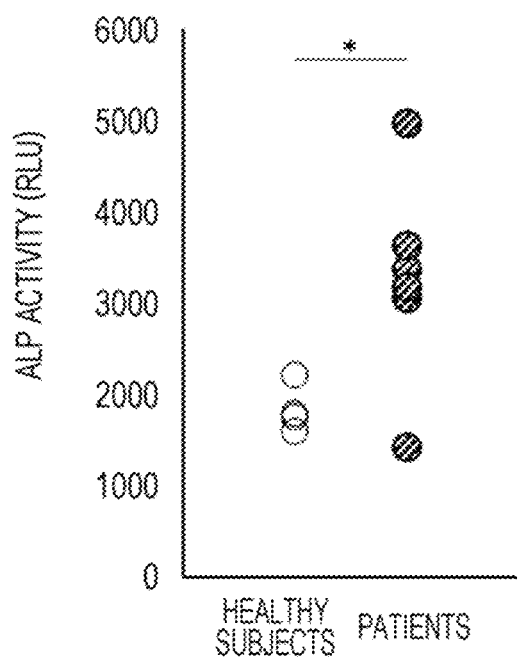
FIG. 8 illustrates alkaline phosphatase (ALP) activity measured in an anti-CD63 antibody-ALP system, compared between plasma of healthy subjects (n=4) and plasma of CVD patients given CAC-S (n=6), wherein *p<0.05 indicates significant difference.

Results of the cases with anti-CD63 antibody used as the capture antibody are illustrated in FIG. 8. The ALP activity was compared between the plasma of healthy subjects (n=4) and the plasma of patients given CAC-S (n=5). *p<0.05 indicates significant difference. The ALP activity of the extracellular vesicle of the healthy subject plasma was found to be significantly lower than the ALP activity of the extracellular vesicle of the patient plasma.

(3) Anti-Annexin VI Antibody-ALP System

Figure 9:
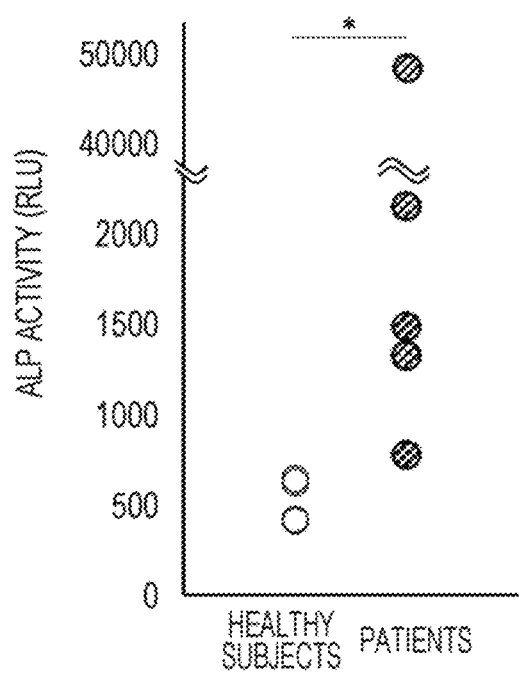
FIG. 9 illustrates alkali phosphatase (ALP) activity measured in an anti-Annexin VI antibody-ALP system, compared between plasma of healthy subjects (n=4) and plasma of CKD patients (n=5), wherein *p<0.05 indicates significant difference.

Results of the cases with anti-Annexin VI antibody used as the capture antibody are illustrated in FIG. 9. The ALP activity was compared between the plasma of healthy subjects (n=4) and the plasma of CKD patients (n=5). *p<0.05 indicates significant difference. The ALP activity of the extracellular vesicle of the healthy subject plasma was found to be significantly lower than the ALP activity of the extracellular vesicle of the patient plasma.

(4) Anti-Pit1 Antibody-ALP System

Figure 10:
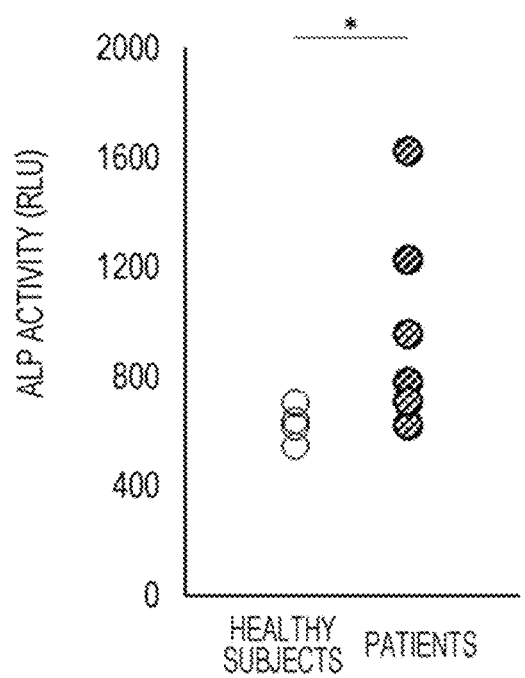
FIG. 10 illustrates alkali phosphatase (ALP) activity measured in an anti-Pit1 antibody-ALP system, compared between plasma of healthy subjects (n=4) and plasma of CVD patients given CAC-S (n=6), wherein *p<0.05 indicates significant difference.

Results of the cases with anti-Pit1 antibody used as the capture antibody are illustrated in FIG. 10. The ALP activity was compared between the plasma of healthy subjects (n=4) and the plasma of patients given CAC-S (n=6). *p<0.05 indicates significant difference. The ALP activity of the extracellular vesicle of the healthy subject plasma was found to be significantly lower than the ALP activity of the extracellular vesicle of the patient plasma.

(5) Comparison Among Measurement Systems

FIG. 11 summarizes analytical performance compared among the measuring systems having been described in (1) to (4). The measurement systems with anti-CD9 antibody and anti-Annexin VI antibody were found to successfully measure all healthy subject plasmas at and above the limit of detection. In the measurement systems with anti-CD63 antibody and the anti-CD9 antibody, the three examined patient plasma groups tended to demonstrate higher ALP activity as compared with the healthy person plasma group. In the case where the calcified extracellular vesicle was captured by its specific anti-Annexin VI antibody, the CAC-S patient plasma group and the CKD plasma group tended to demonstrate higher ALP activity as compared with the healthy person plasma group. Considering overall limit of detection (LOD), dynamic range, simultaneous repeatability, and inter-rater reliability, the measurement system with anti-CD9 antibody was found to demonstrate the highest detection performance.

2-3. Correlation between CAC Score and ALP Activity

Figure 12A:
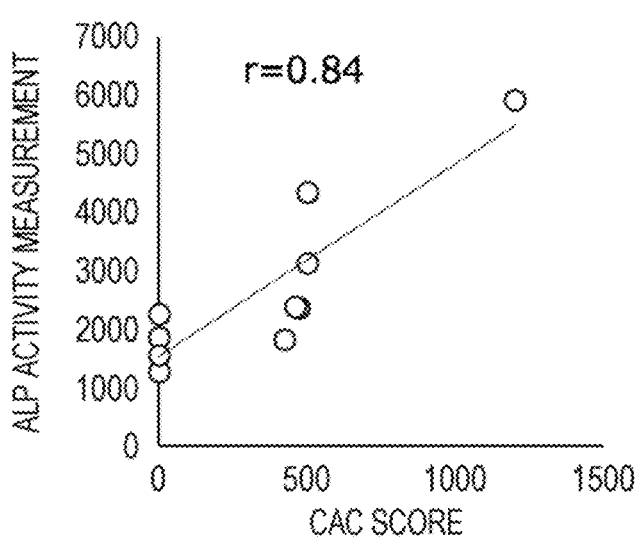
FIG. 12A illustrates correlation between alkali phosphatase (ALP) activity measured in the anti-CD9 antibody-ALP system and CAC score.
Figure 12B:
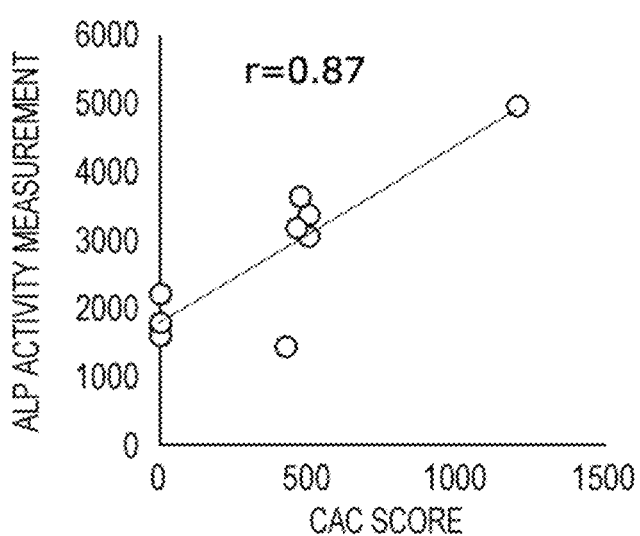
FIG. 12B illustrates correlation between alkaline phosphatase (ALP) activity measured in the anti-CD63 antibody-ALP system and CAC score.
Figure 12C:
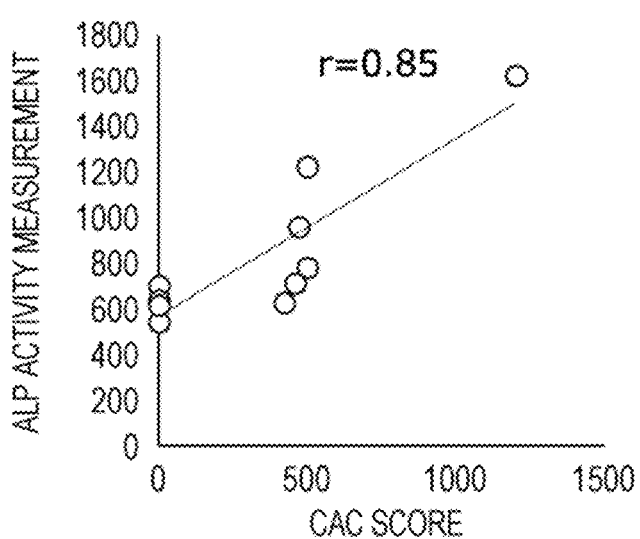
FIG. 12C illustrates correlation between alkaline phosphatase (ALP) activity measured in the anti-Pit1 antibody-ALP system and CAC score.

Correlations of the ALP activity measured in the anti-CD9 antibody-ALP system and the anti-Pit1 antibody-ALP system, with the CAC score were determined. The results are illustrated in FIGS. 12A to 12C. FIG. 12A illustrates correlation between the ALP activity measured in the anti-CD9 antibody-ALP system and the CAC score, with the correlation coefficient found to be 0.84. FIG. 12B illustrates correlation between the ALP activity measured in the anti-CD63 antibody-ALP system and the CAC score, with the correlation coefficient found to be 0.87. FIG. 12C illustrates correlation between the ALP activity measured in the anti-Pit1 antibody-ALP system and the CAC score, with the correlation coefficient found to be 0.85. All cases demonstrated high correlation.

3. Assessment of Onset Risk of Cardiovascular Disease and Vascular Calcification As described previously, the CAC score has been used as an index of severity of vascular calcification, and has been known to be useful for predicting the risk of cardiovascular disease. The ALP activity measured in this example was found to demonstrate good correlation with the CAC score, and was found to be significantly high in the CKD patients and the CVD patients with vascular calcification. The results suggest that the ALP activity of calcified extracellular vesicle in blood is usable as an index of severity of vascular calcification, and also usable as an index of onset risk of cardiovascular disease.

What is claimed is:

1. A method of determining onset risk of cardiovascular disease in a subject, the method comprising:
    identifying a subject having or at risk of developing cardiovascular disease, wherein said subject is not a chronic renal failure patient or a dialysis patient, by performing the following steps (i) and (ii):
    (i) capturing, on a solid phase, an extracellular vesicle derived from a blood sample collected from the subject; and
    (ii) measuring alkaline phosphatase activity of the extracellular vesicle,
    wherein a measured result of the alkaline phosphatase activity is an index of the onset risk of cardiovascular disease in the subject, wherein when the measured result of the alkaline phosphatase activity is equal to or higher than a predetermined threshold value, the subject is identified as having or at risk of developing cardiovascular disease; and
    treating the identified subject by a treatment comprising antihypertensive therapy and/or a medicine suitable for treating cardiovascular disease.

2. The method according to claim 1, wherein the blood sample is whole blood, plasma, or serum.

3. The method according to claim 1, wherein the capturing comprises contacting the blood sample of the subject, the solid phase, and a capture antibody capable of capturing the extracellular vesicle to form a complex of the extracellular vesicle and the capture antibody on the solid phase.

4. The method according to claim 3, wherein the capture antibody is at least one selected from the group consisting of anti-CD9 antibody, anti-CD81 antibody, anti-CD63 antibody, anti-Annexin VI antibody, and anti-Pit1 antibody.

5. The method according to claim 1, wherein the measuring comprises contacting a luminescent substrate with alkaline phosphatase of the extracellular vesicle captured on the solid phase, and detecting a resultant chemiluminescent signal.

6. The method according to claim 1, wherein the cardiovascular disease is at least one selected from the group consisting of ischemic heart disease, ischemic brain disease, and ischemic intestinal disorder.

7. A method for determining vascular calcification in a subject, the method comprising:
  identifying a subject having vascular calcification, wherein said subject is not a chronic renal failure patient or a dialysis patient, by performing the steps (i) and (ii):
  (i) capturing, on a solid phase, an extracellular vesicle derived from a blood sample collected from the subject; and
  (ii) measuring alkaline phosphatase activity of the extracellular vesicle,
  wherein a measured result of the alkaline phosphatase activity is an index of vascular calcification in the subject, wherein when the measured result is equal to or higher than a predetermined threshold value, the subject is identified as having vascular calcification; and
  treating the identified subject having vascular calcification by a treatment comprising antihypertensive therapy and/or medicine suitable for treating vascular calcification.

8. The method according to claim 7, wherein the blood sample is whole blood, plasma, or serum.

9. The method according to claim 7, wherein the capturing comprises contacting the blood sample of the subject, the solid phase, and a capture antibody capable of capturing the extracellular vesicle to form a complex of the extracellular vesicle and the capture antibody on the solid phase.

10. The method according to claim 9, wherein the capture antibody is at least one selected from the group consisting of anti-CD9 antibody, anti-CD81 antibody, anti-CD63 antibody, anti-Annexin VI antibody, and anti-Pit1 antibody.

11. The method according to claim 7, wherein the measuring comprises contacting a luminescent substrate with alkaline phosphatase of the extracellular vesicle captured on the solid phase, and detecting a resultant chemiluminescent signal.

12. The method according to claim 1, wherein the treatment comprises administering to said subject one or more of a phosphorus adsorbent, a cholesterol treating agent, a thrombolytic agent, an antithrombotic agent, and antiplatelet agent, and a vasodilator.

13. The method according to claim 7, wherein the treatment comprises administering to said subject one or more of a phosphorus adsorbent, a cholesterol treating agent, a thrombolytic agent, an antithrombotic agent, and antiplatelet agent, and a vasodilator.

* * * * *